Aug. 17, 1965

J. R. MADDOX ETAL 3,200,443

TIRE LOADER

Filed Oct. 27, 1959

INVENTORS
*James R. Maddox* and
*Anthony T. Fassero*

BY *Mason, Fenwick & Lawrence*

ATTORNEYS

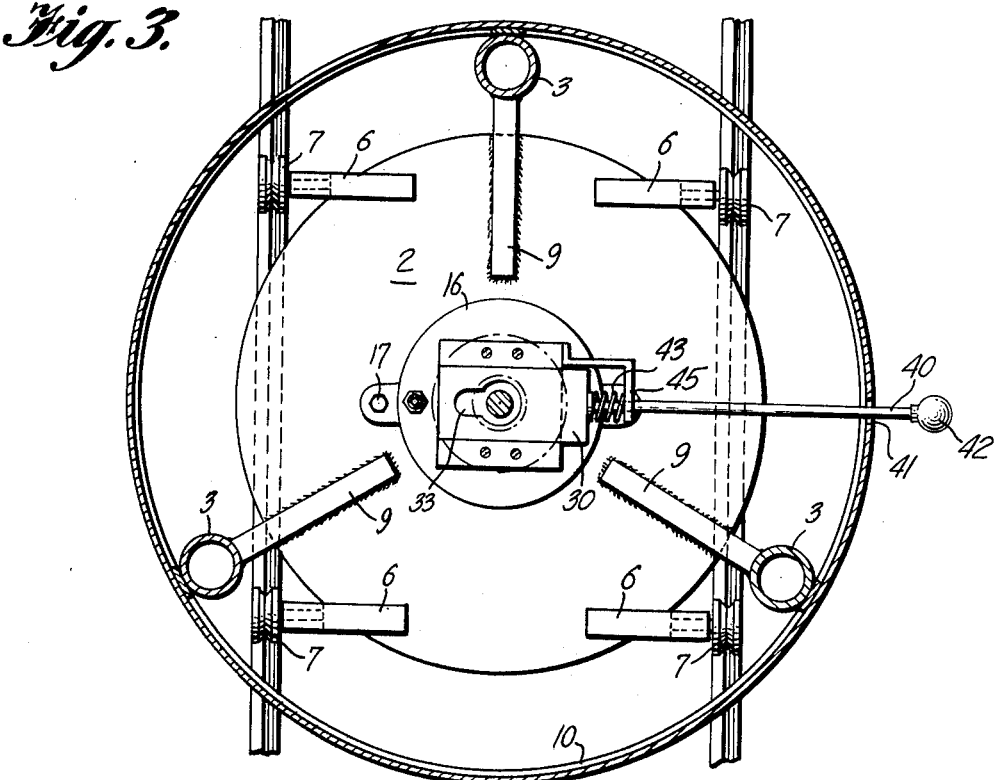
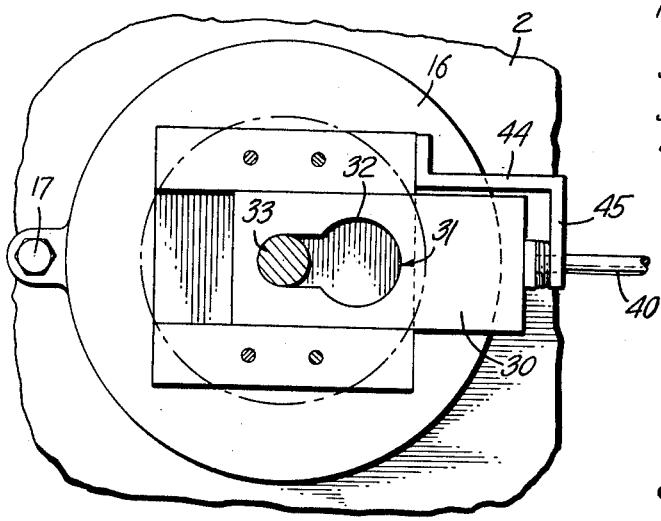
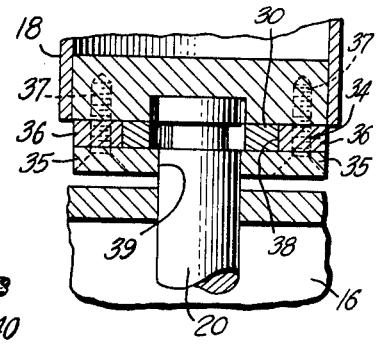
Fig. 3.
Fig. 4.
Fig. 5.
INVENTORS
James R. Maddox and
Anthony T. Fassero
BY Mason, Fenwick & Lawrence
ATTORNEYS Aug. 17, 1965 J. R. MADDOX ETAL 3,200,443
TIRE LOADER
Filed Oct. 27, 1959 4 Sheets-Sheet 4
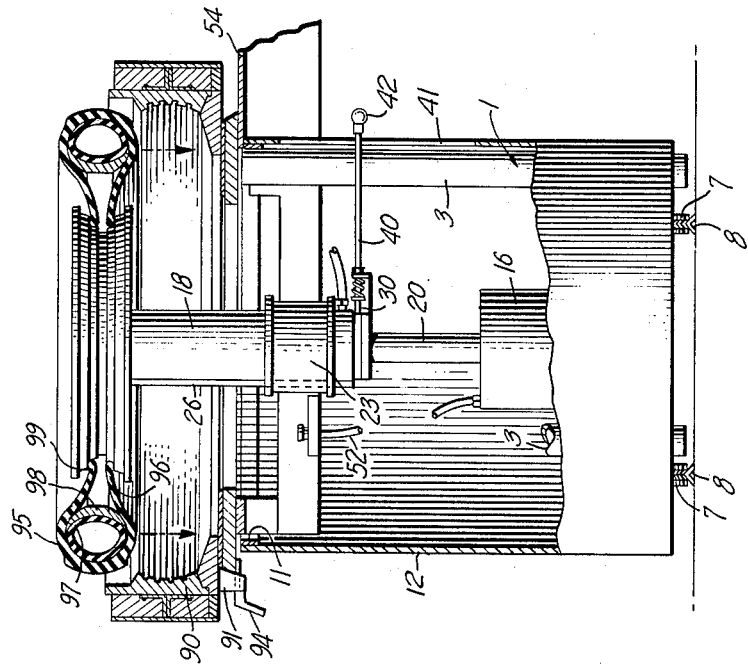
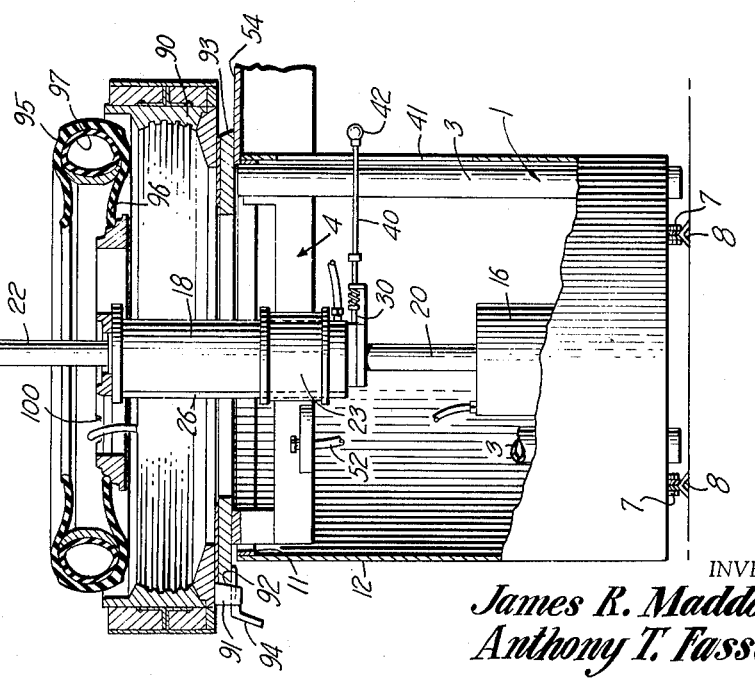
INVENTORS
James R. Maddox and
Anthony T. Fassero
BY Mason, Fenwick & Lawrence
ATTORNEYS 3,200,443
TIRE LOADER
James R. Maddox and Anthony T. Fassero, Oakland, Calif., assignors to Clement O. Dennis, Bibb County, Ga.
Filed Oct. 27, 1959, Ser. No. 849,036
9 Claims. (Cl. 18—18)

This invention relates to tire handling devices, and more particularly to apparatus for loading tires into matrices for recapping, and for removing tires therefrom.

The handling of tires in recapping is a heavy and laborious task. Where the recapping is done in a so-called ring-type matrix, the tire diameter must be reduced in order for the tire to be placed in the mold, or to be removed from it. This can be done by spreading apart the beads of the tire, or by pressing them toward one another after a back-up rim has been put into the tire. Mechanical devices as well as pneumatic apparatus have been used for this purpose. In any event, the tire with the spreader in place must be lifted to seat the tire in the matrix. This is very cumbersome. When the tire is in place in the mold the beads are released and the spreader removed. This operation has to be repeated in reverse order to remove the recapped tire. Tire loading devices have been proposed, but these have been expensive and slow in operation due to the apparent need for a great many pneumatic, or hydraulic, cylinders to provide the required number of operative movements in the desired sequence.

The general object of the present invention is to provide a tire loader which is extremely simple and effective in operation, and which can be manufactured for a fraction of the cost of those now on the market.

A more specific object is the provision of such a device which will have means for manipulating a tire to reduce its diameter and means for lowering a tire into a mold and raising it therefrom, with the two means being operable independently of one another, or in conjunction with one another.

Another object of the invention is to provide a tire loader of this nature which will support a tire above a mold, and let the tire settle into the mold of its own weight, so that the tire will not be damaged, or will forcibly draw the tire into the mold when desirable.

A further object is the provision of such a device which has means for accurately positioning a mold, or matrix, relative to the loader, so that a tire, when lowered into the matrix, will be properly centered within the mold.

Still another object is to provide means for automatically attaching a matrix to the loader when the matrix is positioned on the loader, so that if a tire will not move freely from the matrix after curing, pressure can be applied to the tire without causing the matrix to lift from the loader.

A still further object is to provide a loader which is mounted for free movement within a shop either across the floor or along a trackway so as to be readily accessible at curing racks or other mold positions.

Other objects of the invention will become apparent from the following description of one practical embodiment thereof when taken in conjunction with the drawings which accompany, and form a part of, this specification.

In the drawings:

FIGURE 3 is a horizontal section taken on the line 3—3 of FIGURE 1;

FIGURE 4 is an enlarged detail of the central portion of the structure shown in FIGURE 3, the locking slide being shown in locked position;

FIGURE 5 is a vertical detail section taken on the line 5—5 of FIGURE 1;

FIGURE 6 is a fragmentary horizontal section taken on the line 6—6 of FIGURE 1 showing the mounting of the upper air cylinder for vertical sliding movement;

FIGURE 7 is a view similar to FIGURE 1 showing a matrix in place on the loader and a tire in place for loading;

FIGURE 8 is a view similar to FIGURE 7 showing a tire with its beads compressed ready to be lowered into the matrix; and FIGURE 9 is a diagrammatic view of the air system for operating the loader.

Figure 1:
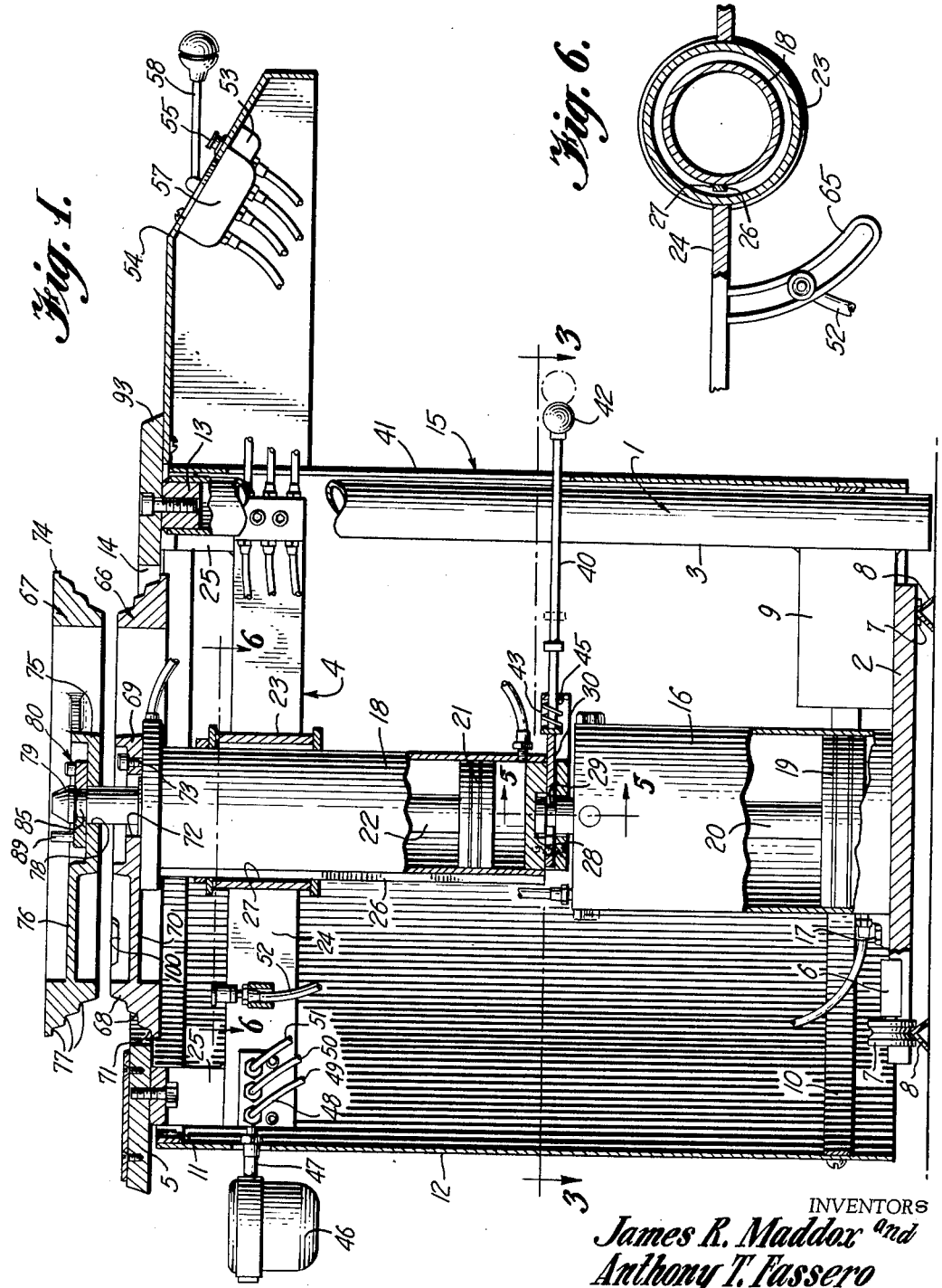
FIGURE 1 is a vertical section through a tire loader embodying the principles of the present invention.

In general, the loader of the present invention consists of a suitable supporting structure for a recapping matrix and a pair of air cylinders superimposed, one on top of the other, with the lower cylinder serving to raise the upper and being connectible to the upper one to forcibly pull it downwardly when desired. The upper cylinder carries means to support a tire and means to compress the tire beads to reduce the tire diameter. Controls are provided to permit independent or simultaneous operation of the air cylinders.

Referring to the drawings in detail, the device is constructed upon a base frame 1 which includes a base plate 2, a plurality of legs, or posts 3, a bridge and cylinder guide 4, and a top plate 5.

Base plate 2 is in the form of a disk and carries a plurality of wheel-supporting bars 6. Suitable rollers, or wheels 7 are rotatably mounted on the bars. The wheels may be grooved to ride on rails 8, so that the loader may be freely moved along a fixed course. The base plate also has fixed to it a plurality of horizontal arms 9 which are connected at their outer ends to the posts 3. The arms are welded, or otherwise rigidly connected to the base plate, and similarly attached to the posts 3. A cover-securing ring 10 is fixed to the posts near their bases to lie in a horizontal position. A like ring 11 is attached to the posts adjacent their tops. A suitable cover, or housing, 12 is fastened to the rings 10 and 11 to form a body for the loader and enclose the working parts. The top plate 5 is an annulus screwed to plugs 13 inserted in the tops of the vertical posts 3. The annular top plate defines a central opening 14 through which the tire supporting and manipulating elements may pass in moving to and from operative positions.

From the above it will be seen that an upright cylindrical unit 15 is formed, having wheels for movement along a track. Legs, or posts, 3 have their bottom ends below the wheels in order that the unit may rest solidly on the legs when removed from the tracks.

Within the upright body unit 15 there are two air cylinders, a tire lifting air cylinder 16 fixed to the base plate 2 by screws 17, and a tire bead compressing air cylinder 18 slidably mounted in the bridge and cylinder guide 4. The two cylinders are mounted in axial alignment with one another and with the annular top plate 5. Cylinder 16 carries a piston 19 having a piston rod 20, and cylinder 18 has a piston 21 and piston rod 22. The upper cylinder 18 seats upon, and is supported and moved vertically by, the piston rod 20 of the lower cylinder.

The bridge and cylinder guide consists of a central sleeve guide 23 from which arms 24 project in opposite directions to form the bridge. The outer ends of arms 24 are connected to brackets 25 which are bolted to the underside of the top plate to suspend the sleeve guide 23 centrally of the body unit. Cylinder 18 has a key 26 extending its full length, and sleeve guide 23 has a matching keyway 27 to hold the cylinder against rotative movement relative to the body unit. This will prevent twisting of the several air hoses, to be described, during raising and lowering of the cylinder.

The bottom of cylinder 18 is provided with a recess 28 in which the end of the piston rod 20 of the lower air cylinder may seat. Piston rod 20 has an annular groove 29 just below its top to cooperate with a locking slide 30 to lock the upper cylinder to the piston rod of the lower one. The locking slide is in the form of a plate having a keyhole slot 31. The large opening 32 of the slot is of sufficient size to allow the head of the piston rod 20 to pass freely through it, while the reduced neck 33 will embrace the rod within the groove 29 and prevent passage of the rod through it. The locking slide is held in position and guided in its movement by means of a trackway 34. This may take the form of a slide plate 35 held spaced from the bottom of cylinder 18 by means of blocks 36. The plate and blocks will be attached to the bottom of cylinder 18 by screws, or bolts, 37. Thus, a slide passage 38 is formed between the bottom of cylinder 18, plate 35 and the guide blocks 36. Plate 35 will have a central opening 39 to permit the piston rod 20 of cylinder 16 to pass freely through it. The locking slide is moved to locked and unlocked position by means of a control rod 40, which extends across the unit and projects through a vertical slot 41 in the housing, or cover, 12 and terminates in a handle, or knob 42. The slot 41 will permit the control rod to move vertically with the cylinder 18. The locking slide is urged toward unlocked position by means of a spring 43 which is coiled about the control rod and bears against the end of the locking slide and a bracket 44 which is attached to one of the spacer blocks 36 and has an arm 45 through which the control rod passes. It will be clear that the upper cylinder will be locked to the lower one only when the control rod 40 is drawn, and held, outwardly to position the neck of the keyhole slot 31 about the groove 29 of the piston rod 20.

The cylinders are operated by compressed air from any suitable source. The air will enter the unit through an air filter 46, air lines 47 to a distributor box 48. Three air lines 49, 50 and 51 will lead from the box 48 to supply a tube inflation hose 52, cylinder 18 and cylinder 16. The line 49 will include an inflation valve 53 attached to the underside of a control panel 54 and having an operating button 55 conveniently positioned on the control panel. The line will have a relief valve 56 set to open at a predetermined pressure and thereby limit the amount of pressure put into the air bag in the tire to be cured and, by the escaping air, inform the operator that the bag is properly inflated. Hose line 50 runs to a four-way valve 57 mounted on the control panel and having an operating handle 58, and then by lines 59 and 60 the air is carried to the top and bottom of cylinder 18 in conventional manner. Line 51 similarly leads to a four-way valve 61 having control handle 62, and the air then passes to the top and bottom of cylinder 16 through lines 63 and 64. The valves 57 and 61 are so connected and operated as to supply air to the tops and bottoms of their respective cylinders and simultaneously release air from the opposite end. The inflation hose 52 may be held conveniently by an elongated loop 65 attached to the arm 24 of the bridge member 4. The elongated loop will serve to tether the line to keep it from fouling and, at the same time, permit some freedom of movement.

Air cylinder 18 is used to support a tire to be loaded, and to compress the beads of the tire to reduce its diameter. To this end, the cylinder 18 carries a pair of tire supporting wheels 66 and 67. The bottom wheel is permanently fixed to the top of the cylinder casing and the top wheel 67 is removably attached to the piston rod 22.

The bottom wheel comprises a rim 68, a hub 69 and a plurality of spokes 70. The rim has around its outer circumference a plurality of steps 71 to receive the beads of tires of different diameters. The hub 69 is centrally apertured, as at 72, to permit piston rod 22 to pass freely through it. The hub is bolted to the top of the cylinder casing by means of bolts 73.

The top wheel 67 has a rim 74, hub 75, and spokes 76, and also has a plurality of annular steps 77 around the rim. The hub of the upper wheel is recessed, and has an opening 78 in its center to fit over the end of piston rod 22, and the piston rod has its upper end tapered, as at 79 to serve to lead the piston rod into the opening 78 of the wheel.

Figure 2:
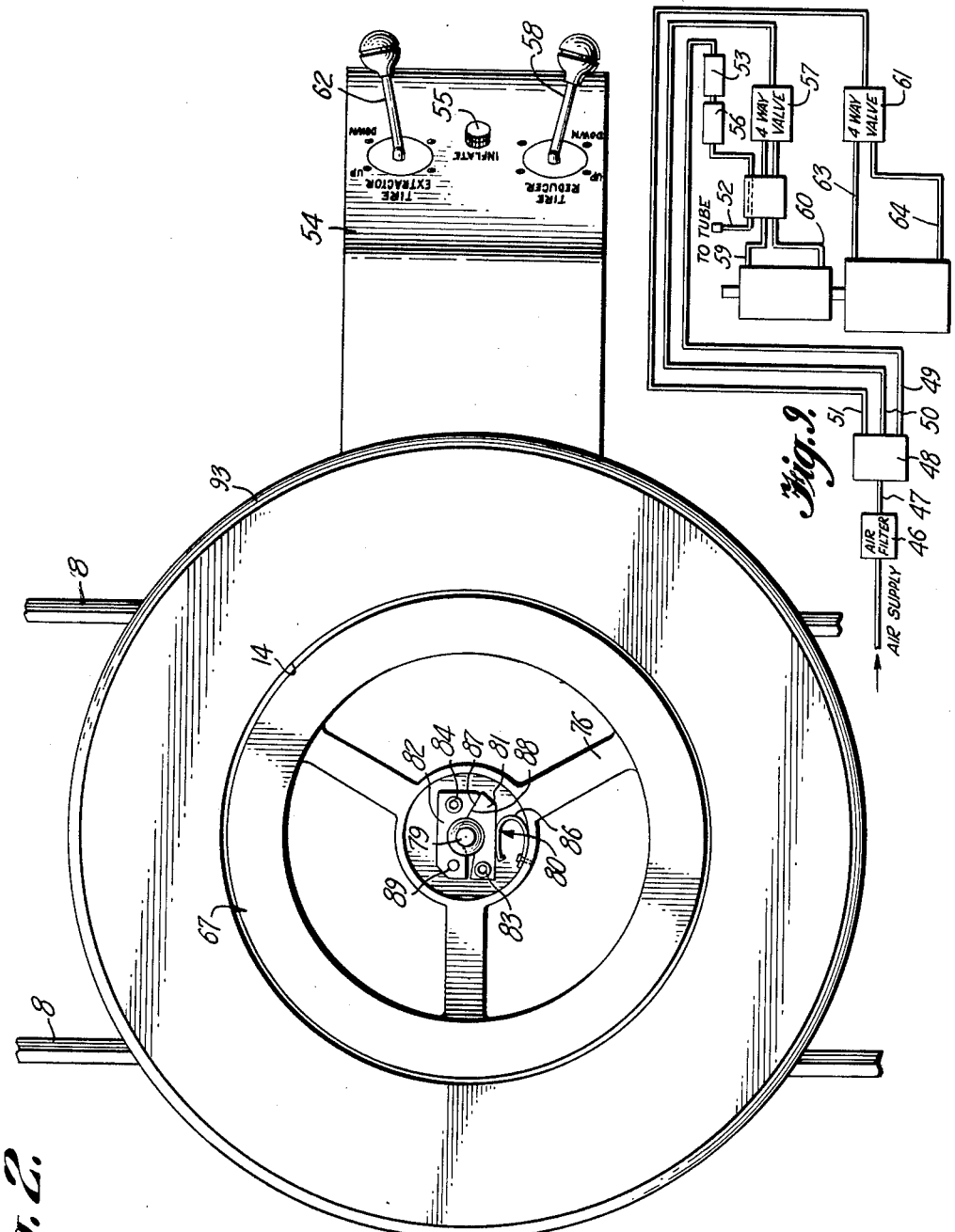
FIGURE 2 is a top plan view of the loader.

The tapered end of the piston rod also serves as an entering wedge to separate the arms of a spring latch 80. The latch 80 comprises a pair of arms 81 and 82, each of which is pivotally connected, as at 83 and 84, to the hub portion of the bead plate, or wheel, 67. The pivots 83 and 84 are on opposite sides of the central opening 78, and therefore, the latch arms extends in opposite directions. The arms are adapted to engage in a groove 85 in the piston rod 22, which is just below the tapered portion at the end of the piston rod. Latch arm 81 is urged by means of a spring 86 into its normal locking position. This arm is provided with a cam face 87 near its end remote from the pivot 83, which is adapted to abut a cam face 88 on the arm 82 adjacent the pivot 84. Arm 82 carries at its free end an operating handle 89. It will be seen from FIGURE 2 that when the arm 82 is moved about its pivot 84, the cam face 88 will about the cam face 87 of arm 81 and cause arm 81 to pivot in an opposite direction, thus swinging both latch arms outwardly to clear the groove in the piston rod 22. When the wheel is slipped over the tapered end of the piston rod the taper will spread the latch arms and spring 86 will snap them into place in the groove 85 when the wheel has been lowered to the proper position. This will automatically attach the wheel to the piston rod.

In operating the device, a ring type matrix 90 is placed upon the top plate 5. The matrix will be provided with a plurality of lugs 91 spaced around its circumference. These lugs will have inclined inner faces 92, and will be so radially spaced from the center of the matrix as to engage the outer inclined edge 93 of the top plate 5. This will act as a centering means to properly place the matrix with respect to the loader. Latch bolts 94 may be provided in the lugs 91 for movement under the top plate 5 to lock the matrix to the loader.

When the matrix has been positioned, the control handle 62 of valve 61 will be moved to supply air to the bottom of cylinder 16 to cause its piston to rise and, consequently, bodily lift the upper cylinder 18. Control handle 58 will also be manipulated to actuate the piston in cylinder 18 so that the piston rod 22 and wheel 67 will be raised. The latch 80 will be released and the top wheel removed from the piston rod. A tire 95 will then be placed upon the bottom wheel 66, and the lower bead 96 of the tire will come to rest in the proper step 71. The tire will have an air bag 97 positioned within it and a back up rim 98 will also be in position behind the air bag. The tire is positioned on the bottom wheel so that the valve stem of the air bag will fit within one of the recesses 100 in the bottom wheel rim and the air valve will be in position for attachment to the inflating hose. While the piston rod 22 is extended upwardly, the top wheel will be replaced and the control handle 58 will be manipulated to pull down the piston rod and the top wheel until the wheel comes in contact with the upper bead 99 of the tire. This downward movement of the piston will be continued to draw the beads of the tire toward one another and pull the side walls over the back up rim 98, thereby reducing the outer diameter of the tire sufficiently to permit the tire to enter the matrix.

When the compression of the beads is completed, the control handle 62 is moved to draw down the piston of air cylinder 16. Due to the fact that the locking slide 30 is in its normal, unlocked position, the piston rod 20 will not be connected to the upper cylinder 18. Therefore, the upper cylinder with the wheels and tire will move downwardly by gravity. If the tire has been reduced in diameter sufficiently, it will move freely into place within the matrix. If it has not been sufficiently reduced in diameter, it will come to rest upon the upper edge of the matrix. The operator can then examine the tire and determine if it can be reduced further in diameter, and if not whether it can be forcibly pulled into the matrix without damage to the recapping rubber strip which has been applied around its periphery. If the tire is to be pulled into the matrix, the lower piston rod 20 is lifted until it seats within the recess 28 in the bottom of cylinder 18, and the handle 42 of the locking slide is pulled outwardly to lock the cylinder to the piston rod. The valve control 62 is then manipulated to forcibly draw down on the piston rod 20 and thereby pull the cylinder 18 and the tire downwardly until the tire is within the matrix. As soon as the handle 42 is released, the slide will move back to its unlocked position due to the bias of the spring 43. A suitable top ring (not shown) may then be placed upon the matrix, the inflation hose connected to the air bag valve and button 55 depressed to inflate the bag. When the proper pressure has been built up, relief valve 56 will operate and the sound of the escaping air will indicate to the operator that the bag is properly inflated. After removal of the top wheel 57 and release of the latch bolts 94, the matrix can be removed for placement on a suitable rack, or other stand, for curing.

When a tire is to be removed from a matrix, the matrix is placed on the top plate of the loader, as previously described, and latch bolts 94 operated to lock the matrix in place. The top matrix skirt ring will then be removed, and the valve controls operated to lift the upper cylinder bodily and to raise the upper piston rod 22. The top wheel will be put in place, and the valve 57 actuated to draw down the piston rod so that the wheels will engage the beads of the tire and compress them to reduce the tire diameter in order to withdraw the tire face from the matrix pattern. When this has been accomplished, valve 61 is operated to lift the upper cylinder to eject the tire from the matrix. If there should be any sticking of the tire, the loader has sufficient force to free it and the matrix, being locked to the top plate, will be held immovable. After the tire has been lifted free of the matrix, the top cylinder is operated to separate the bead wheels, the top wheel is removed and the tire lifted from the bottom wheel. The two four-way valves can then be operated to return parts to their initial inoperative position.

While in the above one practical embodiment of the invention has been disclosed, it will be understood that the details of construction described and shown are merely by way of example and that the invention may take other forms within the scope of the appended claims.

What is claimed is:

1. Apparatus for loading and unloading tires into and from recapping matrices comprising, a body unit having means to seat a matrix thereon in predetermined relation to the body unit, a matrix on the seat, a pair of air cylinder assemblies superimposed upon one another to provide upper and lower cylinder assemblies in vertical axial alignment with one another and with the matrix seating means and with the lower cylinder assembly being fixed to the body unit, each air cylinder assembly including a cylinder, piston and piston rod, means carried by the cylinder of the upper assembly to support a tire, means carried by the piston rod of the upper assembly to engage a tire bead and in cooperation with the tire supporting means to draw the beads of a tire together when the piston rod of the upper cylinder assembly is withdrawn into its cylinder, means to detachably lock the upper cylinder to the piston rod of the lower cylinder assembly, means to connect opposite end of each cylinder to a source of air supply, and separate means to control the flow or air to the respective cylinders.

2. Apparatus for loading and unloading tires into and from recapping matrices as claimed in claim 1 wherein, the means to lock the upper cylinder includes the piston rod of the lower cylinder assembly having a recess therein, a movable locking member carried by the upper cylinder, and means connected to the locking member and projecting to the outside of the body unit to move the locking member into engagement with the recess in the lower piston rod.

3. Apparatus for loading and unloading tires into and from recapping matrices as claimed in claim 2 wherein, spring means yieldably holds the locking member from engagement with the recess in the lower piston rod.

4. Apparatus for loading and unloading tires into and from recapping matrices comprising, a body unit having an annular top plate to seat a matrix and position the matrix in predetermined relation to the body unit, a ring type matrix seated on the angular top plate, a base air cylinder assembly including a cylinder, piston and piston rod vertically positioned within the body unit and fixed to the body unit in axial alignment with the annular top plate, an upper air cylinder assembly including a cylinder, piston and piston rod with the upper cylinder freely seated upon the lower piston rod for vertical movement therewith, the upper air cylinder assembly being in axial alignment with the base cylinder and movable through the annular top plate, means fixed to the upper cylinder to seat a tire, means removably attached to the upper piston rod to engage a tire bead and in cooperation with the tire seating means press the beads of a tire toward one another, and means manually operable to detachably lock the upper cylinder to the lower piston rod, means to connect both ends of each of the air cylinder assemblies to a source of air supply, and separate means to control the flow of air to and from the respective cylinders.

5. Apparatus for loading and unloading tires into and from recapping matrices as claimed in claim 4 wherein the body unit is provided with wheels.

6. Apparatus for loading and unloading tires into and from recapping matrices as claimed in claim 4 wherein an air bag inflating hose is mounted on the body unit.

7. Apparatus for loading and unloading tires into and from recapping matrices as claimed in claim 6 wherein a relief valve is coupled into the inflating hose.

8. Apparatus for loading and unloading tires into and from recapping matrices as claimed in claim 4 wherein means are provided to bias the manually operable locking means to unlocked position.

9. Apparatus for loading and unloading tires into and from recapping matrices comprising, a body unit having means to seat a matrix thereon in predetermined relation to the body unit, a ring type matrix on the matrix seating means, a tire lowering and ejecting double acting air cylinder fixed to the body unit in vertical position and in axial alignment with the matrix seating means, a piston in the cylinder and a piston rod connected to the piston and extending from the cylinder, a tire supporting and bead compressing double acting air cylinder slidably mounted in the body unit above and in axial alignment with the tire lowering and ejecting cylinder and seated upon the piston rod extending from the tire lowering and ejecting cylinder, a piston in the tire supporting and bead compressing air cylinder and a piston rod connected thereto, means carried by the tire supporting and bead compressing cylinder to seat and support a tire for movement to and from the matrix seated on the body unit, means carried by the piston rod in the tire supporting and bead compressing cylinder to engage a bead of a tire and in cooperation with the means carried by the tire supporting and compressing cylinder to compress the beads of a tire when the tire supporting and bead compressing cylinder is operated, means to connect the cylinders to a source of air supply and means to detachably lock the tire supporting and bead compressing cylinder to the piston rod of the tire lowering and ejecting air cylinder.

References Cited by the Examiner

UNITED STATES PATENTS

| | | | |
|---|---|---|---|
| 2,302,133 | 11/42 | Maze | 18—18 |
| 2,353,570 | 7/44 | Kraft | 18—18 XR |
| 2,429,786 | 10/47 | Wright | 18—18 |
| 2,475,579 | 7/49 | Napier | 18—18 |
| 2,734,225 | 2/56 | Glynn | 18—18 |
| 2,745,137 | 5/56 | Glynn | 18—18 |
| 2,775,789 | 1/57 | Soderquist | 18—17 |
| 2,872,704 | 2/59 | Schaevitz | 18—18 |
| 2,923,527 | 2/60 | Fannen | 18—18 |
| 2,948,924 | 8/60 | Clapp | 18—18 |
| 3,067,457 | 12/62 | Dennis et al. | 18—18 XR |

WILLIAM J. STEPHENSON, *Primary Examiner.*

MICHAEL V. BRINDISI, *Examiner.*